United States Patent [19]

Kuroda et al.

[11] Patent Number: 5,045,619

[45] Date of Patent: Sep. 3, 1991

[54] N-ALKENYLCARBAMATE MACROMER

[75] Inventors: Nobuyuki Kuroda; Hiroshi Kobayashi, both of Yokohama; Kazuo Matsuura, Tokyo, all of Japan

[73] Assignee: Nippon Oil Co., Ltd., Minato, Japan

[21] Appl. No.: 336,588

[22] Filed: Apr. 10, 1989

Related U.S. Application Data

[63] Continuation-in-part of Ser. No. 171,378, Mar. 21, 1988, abandoned.

[30] Foreign Application Priority Data

Mar. 27, 1987 [JP] Japan .................................. 62-71719

[51] Int. Cl.$^5$ .................................. C08F 26/02
[52] U.S. Cl. .................................. 526/301; 560/166
[58] Field of Search .................. 526/301; 560/166

[56] References Cited

U.S. PATENT DOCUMENTS

| | | | |
|---|---|---|---|
| 2,197,479 | 4/1940 | Meigs et al. | 560/166 |
| 3,627,819 | 12/1971 | Nowak | 526/301 |
| 3,786,116 | 1/1974 | Milkovich et al. | 260/885 |
| 3,896,161 | 7/1975 | Borden et al. | 526/320 |
| 4,259,462 | 3/1981 | Nakano et al. | 526/320 |
| 4,384,097 | 3/1983 | Wingler et al. | 526/320 |
| 4,708,999 | 11/1987 | Marten | 526/320 |

OTHER PUBLICATIONS

Chemical Abstracts, vol. 76, Jun. 30, 1972: Index Guide, Section IV: Selection of Index Names for Chemical Substances, Subsection H, Illustrative list of Substituents; paragraph 294, p. 130I.

P. Masson et al., Polymer Bull. 7, 17-22 (1982).

P. Remsp et al., Makromol. Chem. Suppl., 8, 3-15 (1984).

Kawakami et al., Makromol. Chem., 185, 9-18 (1984).

Goethals et al., Polym. Bull., 4, 521-525 (1981).

*Primary Examiner*—Joseph L. Schofer
*Assistant Examiner*—Alex H. Walker
*Attorney, Agent, or Firm*—Schmeiser, Morelle & Watts

[57] ABSTRACT

A novel N-alkenylcarbamate macromer is disclosed. The macromer can be prepared by reacting an alkenyl isocyanate with a polyalkylene glycol monoalkyl ether. When polymerized or copolymerized with other monomers, the macromer produces comb-shaped polymers useful as compatibilizing agents, matrices for polymeric solid electrolytes, etc.

6 Claims, No Drawings

N-ALKENYLCARBAMATE MACROMER

This application is a continuation-in-part of U.S. application Ser. No. 07/171,378, filed on Mar. 21, 1988 now abandoned.

BACKGROUND OF THE INVENTION

1. Field of the Invention

This invention relates to a novel N-alkenylcarbamate macromer.

2. Description of the Prior Art

As a means for developing functional polymeric materials, it has recently been proposed to polymerize various macromers (i.e., polymerizable monomers having a relatively high-molecular-weight substituent group containing a certain type of repeating units) and thereby produce comb-shaped graft polymers. The already proposed macromers include acrylate macromers, styrene macromers, vinyl ether macromers, oxazoline macromers and the like. Among acrylate macromers, for example, there are methyl methacrylate derivatives having repeating units of the formula $-(-CH_2CH_2O-)-$ [P. Masson et al., Polym. Bull., 7, 17 (1982)], methacrylate derivatives having repeating units of the formula

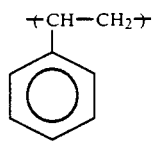

(U.S. Pat. No. 3,786,116), methyl methacrylate derivatives having repeating units of the formula

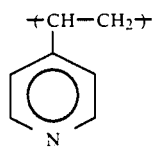

[P. Rempp et al., Makromol. Chem., Suppl., 8, 3 (1984)], methyl methacrylate derivatives having repeating units of the formula

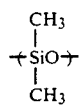

[Kawakami et al., Makromol. Chem., 185, 9 (1984)], methyl methacrylate derivatives having repeating units of the formula

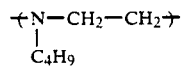

[E. J. Goethals et al., Polym. Bull., 4, 521 (1981)], and the like. Also in the case of styrene macromers, vinyl ether macromers and oxazoline macromers, there have been proposed a large number of compounds having various types of repeating units.

The comb-shaped polymers obtained by polymerizing such macromers are useful in various fields of application where a combination of certain properties and functions (such as microscopic phase separating structure, amphipatic property, surface activity, etc.) is required. More specifically, they are suitable for use as surface or interface modifying agents (for rendering a surface hydrophobic or water-repellent, for rendering an interface hydrophilic, or for improving adhesion properties), compatibilizing agents, impact-resistant resins, adhesives, medical materials (by utilization of their antithrombotic properties), permeable membranes, age resistors, polymeric catalysts, matrices for polymeric solid electrolytes, etc.

SUMMARY OF THE INVENTION

The present inventors have made a thorough search for a macromer capable of producing a comb-shaped graft polymer having many such functions, and have now found a novel macromer as described below.

According to the present invention, there is provided an N-alkenylcarbamate macromer having the general formula

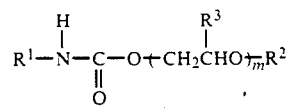

where $R^1$ is a vinyl, isopropenyl, isobutenyl, isopentenyl, isohexenyl or isoheptenyl group, $R^2$ is an alkyl group of 1 to 10 carbon atoms, $R^3$ is hydrogen or an alkyl group of 1 to 3 carbon atoms, and m is a whole number ranging from 1 to 30. There is also provided a method for preparing the novel macromer claimed herein.

DETAILED DESCRIPTION OF THE INVENTION

The macromer of the present invention can be prepared by reacting an alkenyl isocyanate with a polyalkylene glycol monoalkyl ether.

Specific examples of the alkenyl isocyanate used for this purpose include vinyl isocyanate, isopropenyl isocyanate, isobutenyl isocyanate, isopentenyl isocyanate, isohexenyl isocyanate, isoheptenyl isocyanate and the like. Among these compounds, vinyl isocyanate and isopropenyl isocyanate are especially preferred.

The polyalkylene glycol monoalkyl ether used in the present invention is a compound of the general formula

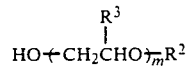

where $R^2$ is an alkyl group of 1 to 10 carbon atoms, $R^3$ is hydrogen or an alkyl group of 1 to 3 carbon atoms, and m is a whole number ranging from 1 to 30. Specific examples thereof include polyethylene glycol monomethyl ether, polypropylene glycol monomethyl ether, polybutylene glycol monomethyl ether, polyethylene glycol monoethyl ether, polypropylene glycol monoethyl ether, polybutylene glycol monoethyl ether, polyethylene glycol mono-n-propyl ether, polypropylene glycol mono-n-propyl ether, polyethylene glycol monoisopropyl ether, polyethylene glycol mono-n-butyl ether, polyethylene glycol monoisobutyl ether, polyethylene glycol monooctyl ether and the like. Among these compounds, polyethylene glycol monomethyl ether and polyethylene glycol monoethyl ether are especially preferred. m is a whole number ranging from 1 to 30 and preferably from 2 to 20.

Although the alkenyl isocyanate may be reacted with the polyalkylene glycol monoalkyl ether in the presence or absence of a solvent, it is preferable to carry out the reaction in the presence of a solvent. For this purpose, there may be used any aprotic solvent that is inert to alkenyl isocyanates and polyalkylene glycol monoalkyl ethers. Specific examples thereof include hydrocarbons such as hexane, heptane, benzene, toluene, etc.; and ethers such as diethyl ether, diisopropyl ether, di-n-butyl ether, tetrahydrofuran, dioxane, etc.

In reacting the alkenyl isocyanate with the polyalkylene glycol monoalkyl ether, the reaction temperature may range from $-70°$ C. to $+40°$ C. and preferably $-10°$ C. to $+10°$ C. The reaction time may range from 0.5 to 40 hours and preferably from 2 to 5 hours. The molar ratio of the alkenyl isocyanate to the polyalkylene glycol monoalkyl ether may preferably range from 1:1 to 1.2:1.

The macromer thus obtained can be polymerized in a solvent with the aid of a conventional radical polymerization initiator, such as N,N'-azobisisobutyronitrile, benzoyl peroxide, etc., to produce a comb-shaped polymer having polyether side chains.

Specific examples of the solvent used for this purpose include alcohols such as methanol, ethanol, isopropanol, n-butanol, etc.; and ethers such as diethyl ether, isopropyl ether, tetrahydrofuran, dioxane, etc. The polymerization temperature may range from 30° C. to 100° C. and preferably from 40° C. to 60° C.

The macromer of the present invention can also be copolymerized with radical-polymerizable vinyl compounds. Specific examples of such radical-polymerizable vinyl compounds include styrene, α-methylstyrene, methyl acrylate, methyl methacrylate, acrylonitrile and the like.

When polymerized or copolymerized in the above-described manner, the macromer of the present invention produces novel comb-shaped polymers containing repeating units of the formula

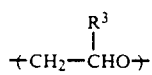

in the side chains. These comb-shaped polymers are suitable for use as compatibilizing agents, matrices for polymeric solid electrolytes, etc.

The present invention is further illustrated by the following Reference Example and Examples. However, it is to be understood that the present invention is not limited thereto.

REFERENCE EXAMPLE

Synthesis of Vinyl Isocyanate

Into a 1-liter flask fitted with a thermometer and a dropping funnel was charged a solution of 78.2 g (1.2 moles) of sodium nitride in 200 ml of water. After the solution was cooled to 0° C., a mixture of 88.8 g (1.0 mole) of acryloyl chloride and 250 ml of dry toluene was placed in the dropping funnel and added dropwise to the solution over a period of about an hour. During this period, the solution was vigorously stirred so that its temperature might not exceed 10° C. After completion of the addition, the stirring was continued for an additional 30 minutes. Thereafter, the upper toluene layer was washed eight times with 50 ml portions of cold water containing sodium bicarbonate, and then once with 40 ml of ice-cold water. After the addition of about 20 g of anhydrous sodium sulfate, the toluene layer was dried in a refrigerator for two whole days.

A 1-liter flask fitted with a thermometer, a dropping funnel and a fractional distillation column was purged with nitrogen, and charged with 200 ml of dry toluene and 15 g of dinitrobenzene, followed by heating to 85° C. Then, the above toluene solution containing acryloyl nitride was added dropwise to the flask. During the addition, the toluene within the flask was vigorously stirred so that its temperature might not exceed 95° C. The formed vinyl isocyanate emerged from the top of the fractional distillation column. By cooling the receiver with dry ice, 48 g (70% yield) of distillate was recovered in the vicinity of 39° C.

The structure of the product was confirmed by the following analytical results.

Infrared absorption spectrum (cm$^{-1}$): 2270, 1650, 990.

Proton NMR spectrum (ppm, in CDCl$_3$, with TMS as a reference): 6.0 (1H), 4.9 (2H).

EXAMPLE 1

Synthesis of Macromer

A 100-ml receiver fitted with a three-way cock was purged with nitrogen. Then, using an injector, 20 ml of dry benzene and 20 g (57 mmoles) of dry polyethylene glycol monomethyl ether (MW 350) were added thereto and cooled to 0° C. Thereafter, 4.7 g (68 mmoles) of vinyl isocyanate was slowly added dropwise thereto with stirring.

After completion of the addition, the stirring was continued at 0° C. for 6 hours. On completion of the reaction, the benzene and the excess vinyl isocyanate were distilled off under reduced pressure to obtain about 24 g of a N-vinylcarbamate macromer of the formula

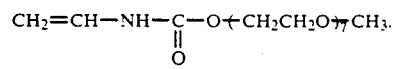

The structure of the product was confirmed by the following analytical results.

Elemental analysis: C, 53.1%; H, 8.4%; N, 3.6%; O, 34.9%.

Infrared absorption spectrum (cm$^{-1}$): 3300, 2870, 1730, 1650, 1520, 1440, 1400, 1350, 1300, 1250, 1110, 980, 950, 850.

Polymerization of Macromer 10.5 g (about 25 mmoles) of the macromer synthesized in the above-described manner was mixed with methanol to make a total volume of 16.7 ml. Then, 54.8 mg (0.334 mmoles) of N,N'-azobisisobutyronitrile was dissolved therein to prepare a polymerization mixture. After a 100-ml glass ampule fitted with a three-way cock was purged with nitrogen, the above polymerization mixture was poured thereinto with an injector. Then, the polymerization mixture was subjected three times to a deairing procedure which comprised freezing with liquid nitrogen, deairing and thawing. Thereafter, the polymerization mixture was frozen, placed in a tube, and sealed the tube under high vacuum. Then, the polymerization mixture within the sealed tube was allowed to react at 60° C. for 6 days.

After the lapse of the predetermined time, the tube was unsealed and its contents were poured into a large volume of diethyl ether. The polymer so purified was collected, dissolved in benzene, and freeze-dried. Its yield was 3.5 g and its molecular weight as measured with a vapor pressure osmometer was 6,300.

EXAMPLES 2 TO 5

A number of N-alkenylcarbamate macromers were synthesized by using various alkenyl isocyanates and polyalkylene glycol monoalkyl ethers as shown in the following Table.

TABLE

| | Alkenyl isocyanate | Polyalkylene glycol monoalkyl ether $R^3$<br>$HO\!\!+\!\!CH_2CHO\!\!+\!\!_m\!R^2$ | N-alkenylcarbamate macromer<br>$R^1$ H $R^3$<br>$H_2C\!=\!C\!-\!N\!-\!C\!-\!O\!\!+\!\!CH_2CHO\!\!+\!\!_m\!R^2$<br>$\parallel$<br>$O$ |
|---|---|---|---|
| Example 2 | Isopropenyl isocyanate | Polyethylene glycol monomethyl ether $(m = 7, R^2 = CH_3, R^3 = H)$ | $m = 7, R^2 = CH_3, R^3 = H$ |
| Example 3 | Isobutenyl isocyanate | Same as above | $m = 7, R^2 = CH_3, R^3 = H$ |
| Example 4 | vinyl isocyacate | Polyethylene glycol monomethyl ether $(m = 3, R^2 = CH_3, R^3 = H)$ | $m = 3, R^2 = CH_3, R^3 = H$ |
| Example 5 | Same as above | Polypropylene glycol monomethyl ether $(m = 7, R^2 = CH_3, R^3 = CH_3)$ | $m = 7, R^2 = CH_3, R^3 = CH_3$ |

What is claimed is:

1. A comb shaped uncross-linked polymer comprising the repetitive unit

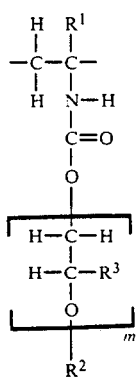

where $R^1$ is H or an alkyl group of 1 to 5 carbon atoms, $R^2$ is an alkyl group of 1 to 10 carbon atoms, $R^3$ is H or an alkyl group of 1 to 3 atoms and m is a whole number ranging from 3 to 30.

2. The comb-shaped polymer of claim 1 wherein the polyalkylene glycol monoalkylether of the macromer reactant of said polymer is a compound of the general formula:

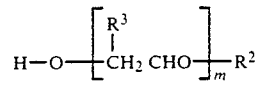

where $R^2$ is an alkyl group of 1 to 10 carbon atoms, $R^3$ is H or an alkyl group of 1 to 3 carbon atoms and m is a whole number ranging from 3 to 30.

3. The comb-shaped polymer of claim 2 wherein the macromer is derived as a reaction product of an alkenyl isocyanate with a polyalkylene glycol monoalkyl ether.

4. The comb-shaped polymer of claim 3 wherein the polyalkylene glycol monoalkyl ether of the macromer reactants and which defines said comb shape in said polymer is a compound of the general formula

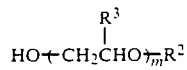

where $R^2$ is an alkyl group of 1 to 10 carbon atoms, $R^3$ is hydrogen or an alkyl group of 1 to 3 carbon atoms, and m is a whole number ranging from 3 to 30.

5. The comb-shaped polymer as claimed in claim 4 wherein polyalkylene glycol monoalkyl ether is polyethylene glycol monomethyl ether, polypropylene glycol monomethyl ether, polybutylene glycol monomethyl ether, polyethylene glycol monoethyl ether, polypropylene glycol monoethyl ether, polybutylene glycol monoethyl ether, polyethylene glycol mono-n-propyl ether, polypropylene glycol mono-n-propyl ether, polypropylene glycol monoisopropyl ether, polyethylene glycol mono-n-butyl ether, polyethylene glycol monoisobutyl ether or polyethylene glycol monooctyl ether.

6. The comb-shaped polymer as claimed in claim 5 wherein the molar ratio of the alkenyl isocyanate to the polyalkylene glycol monoalkyl ether ranges from 1:1 to 1.2:1.

* * * * *